United States Patent Office 2,943,823
Patented July 5, 1960

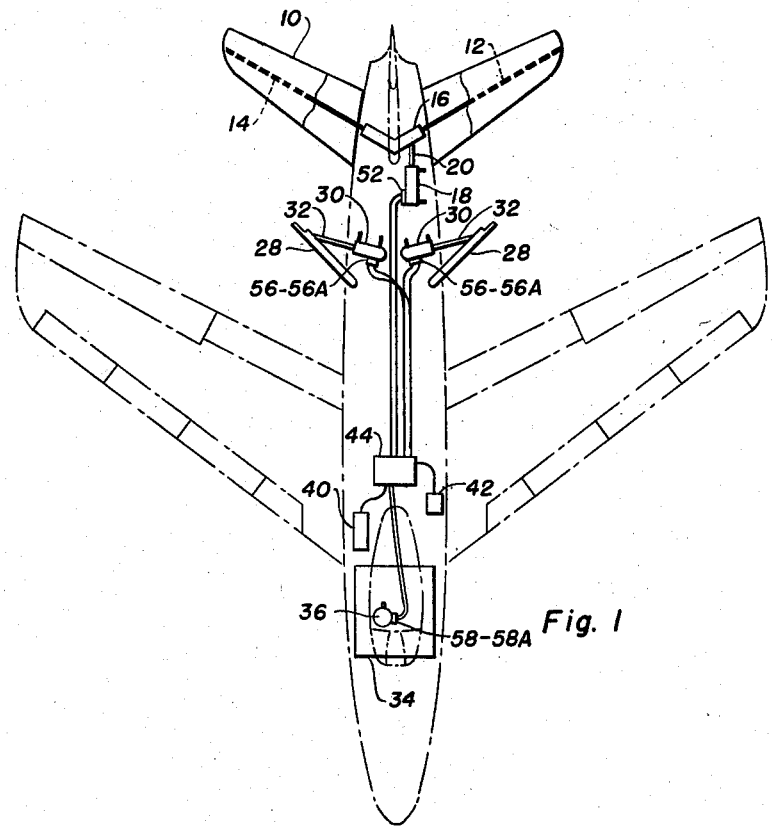
Fig. 1
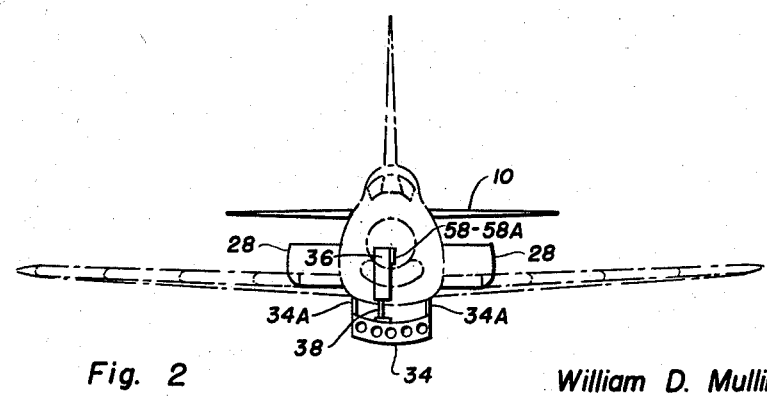
Fig. 2
William D. Mullins, Jr. &
Frederick W. Morganthaler
INVENTORS
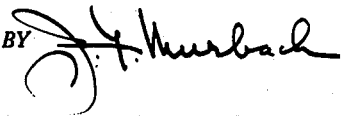
AGENT.

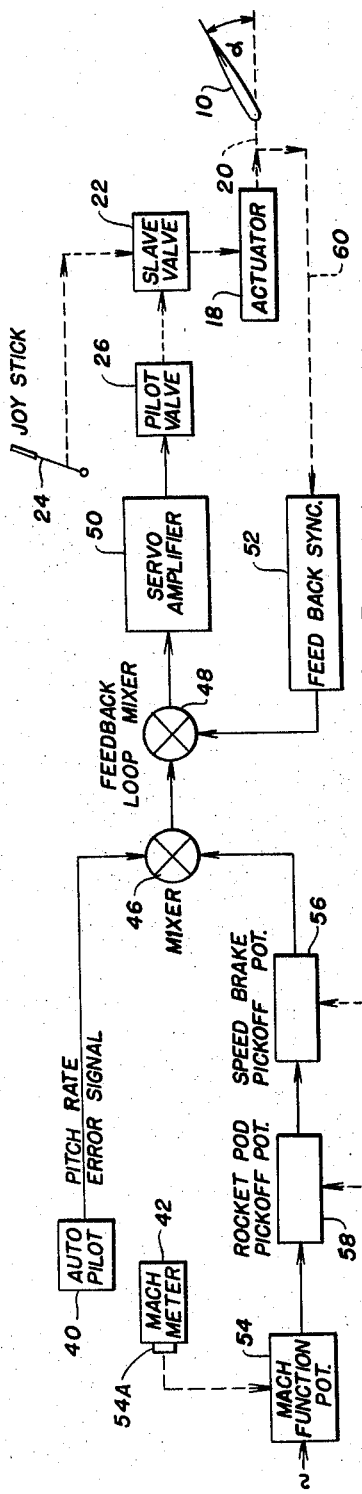
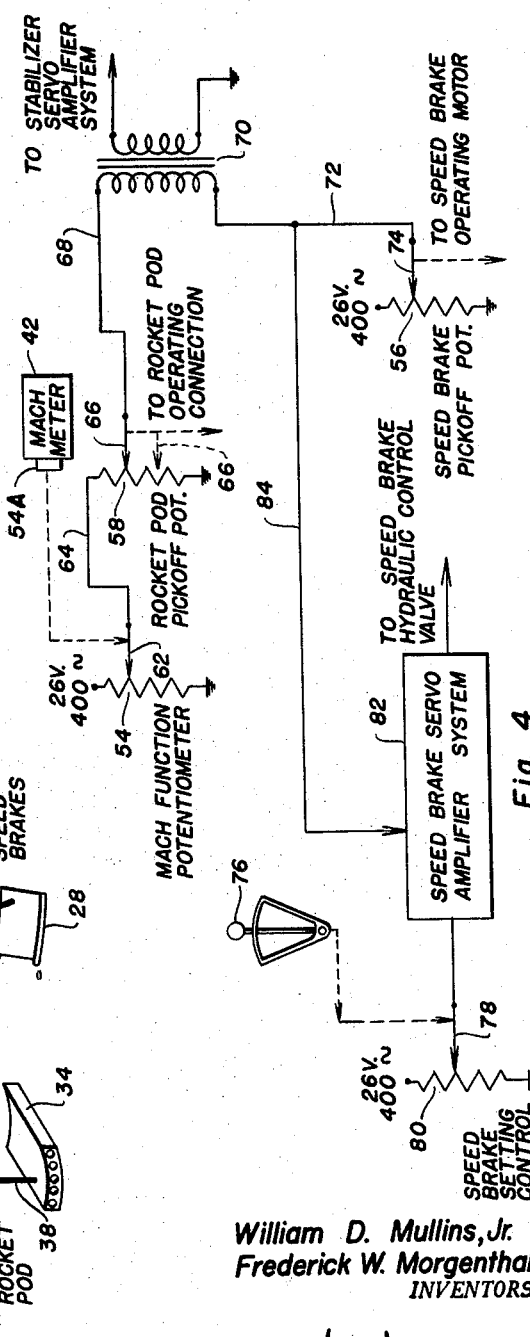
William D. Mullins, Jr. &
Frederick W. Morgenthaler
INVENTORS
AGENT.

2,943,823
TRIM CORRECTION SYSTEM FOR HIGH SPEED VEHICLES

William D. Mullins, Jr., Downey, and Frederick W. Morgenthaler, Whittier, Calif., assignors to North American Aviation, Inc.

Filed June 22, 1954, Ser. No. 438,402

4 Claims. (Cl. 244—77)

The subject invention relates to automatic trim of the attitude of a high speed vehicle to correct for unwanted deviations from a prescribed attitude occasioned by changes in drag establishing an unbalanced moment acting about at least one of the reference axes of the vehicle.

In connection with dirigible vehicles operating in a fluid medium and deriving support therefrom by which they are sustained in space, it is evident that whenever any external appurtenances, or equipment other than the surfaces normally employed for directional control, are caused to vary their positional relationship with respect to the vehicle, they also will have an effect on the direction of movement or attitude of the vehicle. As is well known, this effect is the result of unbalanced drag action about one or more of the reference axes and arising from the action of the fluid stream on the projecting appurtenance. In relatively slow moving vehicles, correction of the effects causing deviation from a desired course can be obtained merely by observing the amount of departure and introducing a corresponding adjustment to the steering controls. But in very high speed craft such as modern airplanes there are two factors of paramount importance that must be taken into consideration and which demand a correction system of advanced type. In the first place the time element at very high speeds is critical. Thus the correction must be made instantaneously and in proper amount. Secondly, pilots of modern aircraft have such a complex job, that even if they could act fast enough, they should not be burdened with the task but rather it should be accomplished automatically. Also as is generally well known the drag effect increases as an exponential function of speed. Furthermore, it is determined by the extent of projection or relative movement of the movable appurtenance. Therefore any corrective effect should be proportioned to take these factors into consideration.

With these citeria in mind it is the principal object of this invention to provide a trim correction system that will operate automatically to provide a correction for drag effects introduced by projection or by angular changes of position of external equipment of vehicles.

It is another object to provide a trim correction that shall be in proportion to the extent of projection (or to the angular change of position) of the appurtenance.

A further object is to provide a trim correction system that will respond with a correction factor which will reflect the variation of the drag effect with speed.

Another object is to provide a trim correction system adapted to be coupled to an autopilot system to feed a correction signal into the latter to cause a combined modified signal to be applied to control the operation of a servo system.

A still further object is to equip a vehicle with necessary devices of retractable type comprising items such as retractable rocket pods, bomb racks, air brakes, and the like which when extended, produce an attitude deviation moment, and to provide in association therewith a system for fully counteracting the disturbing moment.

These and other objects and advantages will become apparent from the description and drawings forming a part hereof.

In these drawings:

Fig. 1 is a phantom plan view of an airplane having extendible equipment and a trim correction system operatively associated therewith;

Fig. 2 is a front elevation of the same airplane shown in Fig. 1;

Fig. 3 is a schematic diagram of the control mechanism constituting a trim correction system; and Fig. 4 is a schematic diagram illustrating certain of the elements of Fig. 3 in greater detail.

In the drawings, an airplane has been chosen as the most suitable vehicle to illustrate the subject invention as in that environment it would find its greatest usefulness. This is due to the fact that airplanes and especially military types are becoming capable of ever greater speeds and in high speed aircraft any protrusion beyond the streamlined envelope will cause undesired drag and diverted aerodynamic airstream effects. The aim, of course, is to eliminate as many protrusions as possible. As is well known, certain necessary equipment used infrequently is made retractable. In the present case such retractable equipment is shown as a retractable weapon pod and speed limiting air brakes.

A weapon pod is a mount for supporting weapons such as rockets and including means for firing them by remote control. By making the pod retractable, the sleek aerodynamic surface is normally undisturbed except when the pod is extended to permit firing of the rockets. Such a pod may conveniently be located in the belly of the airplane and when extended it immediately introduces drag moment forces which react on the airframe tending to cause an angular deviation about the pitch axis.

Air brakes, also known as speed brakes, dive brakes, or spoilers, are utilized to check the speed of the airplane during tactical dives including dive bombing operations, instrument landing approaches or in any maneuver in which a deceleration force would be useful. In the presently preferred form, such air brakes consist of a pair of symmetrically disposed panels hingedly mounted on either side of the fuselage to normally lie flush in the aircraft skin. They may be extended from the flush position to project at an angle into the airstream for the purpose of increasing the resistance to forward motion and in so doing the force moment created thereby also tends to change the attitude of the airplane. With the air brakes located as shown in the drawings this change will be about the pitch axis.

In present day airplanes, autopilot systems are provided to automatically control the flight of the craft by operating the flight control surfaces through servo power means without attention other than supervisory by the pilot. Advantage may be taken of this existing equipment to carry out the purposes of this invention. Thus it is herein taught that signal generation means may be applied to the extendible weapon pod and to the air brakes so that upon movement of these members, a signal in the form of position data will be had which can be fed into the autopilot system to cause it to properly readjust the control surfaces through the servo power units. This compensation signal can accurately reflect the extent of movement of the air brakes or other appurtenance if the signal generator is a continuously variable unit such as a potentiometer or a synchro type unit. Thus through practice of this invention, a high speed airplane may be landed during all weather conditions by coordinating the airframe stability as the airspeed is reduced by the air brakes in such a manner that the trim is continuously altered as directed by the angular position of the brakes with reference to the stabilized airframe. Such coordinated operation is particularly required during a ground approach by means of the instrument landing method known as "I.L.S." whereunder the airplane is radio controlled by beams radiated from the ground in a geometrical path pattern by automatic transmitters located in the immediate vicinity of the landing field. However, coordinated pitch trim is also highly desirable during tactical dives as previously indicated. In any case, the problem of continuously correcting the pitch trim of an airplane in flight as its speed is suddenly reduced by means of air brake spoilers extended outwardly from the aircraft imposes severe requirements for stability within the structural limitations of the airframe, particularly when the aircraft is controlled via its autopilot.

Where several items of extendible equipment are applied to the same aircraft, it may be that two such items would be projected at the same time in which case, the disturbing moments would be cumulative even though in the algebraic sense one might be positive and the other negative. Therefore for the sake of simplicity the signal generators might be connected into a combining circuit adapted to receive the separate signals and from them produce a single resultant calculated to properly change the pitch trim by biasing the pitch control surface servo in the proper amount and direction. In such a system it would also be desirable to tie-in the provision for modifying the response of the pitch control servo in accordance with airspeed and this can readily be accomplished by including in the combining section a variable unit actuated by changes in airspeed. This variable unit would then act to govern or regulate the value of the modifying signal before it is passed on to be mixed with the autopilot signal transmitted to the pitch control servo.

Referring more specifically to Figs. 1 and 2 of the drawings, a high speed airplane configuration is shown in phantom as the means of locating in approximately correct physical relationship, the essential elements involved in the subject invention. An airplane of this type may be equipped with an "all-movable" horizontal stabilizer surface 10 adapted to provide longitudinal stability, trim about the pitch axis and elevator type control which last function might be accomplished by use of a tab-like section of the trailing portion of the stabilizer surface; this portion being independently adjustable. Such a surface may consist of right and left hand panels formed with considerable sweep back and mounted for conjoint rotation on respective torque tubes 12 and 14. These are operatively joined as at 16 and may be rotated through a limited range by means of an hydraulic motor 18 connected thereto by a link 20. The power supply for this hydraulic motor may be entirely conventional and is not shown. Likewise the immediate control of this motor is more or less conventional and includes a slave valve 22 which may either be operated directly (as shown in Fig. 3) by the pilot operating a control stick 24 or may be operated by the autopilot system indirectly through a pilot valve 26.

The airplane is further equipped with two air brake units 28 disposed on opposite sides of the fuselage and hingedly mounted to normally lie flush in the fuselage skin. The air brake units 28 may be extended to any angular position such as is shown in the drawings by suitable means including respective hydraulic motors 30 having their operating piston rods 32 connected to the respective brake units. When these brake surfaces are extended to any of several operative positions such as shown in the drawings, they will immediately cause a proportionate increase in the drag of the airplane, which will act to decrease its speed and at the same time, because of the particular relative location of the brake surfaces, the drag force will establish a turning moment about the pitch axis.

The retractable weapon pod designated 34 is conveniently located in the bottom forward portion of the fuselage. When retracted it forms a flush continuation of the belly skin but when extended to combat position, it creates considerable drag and this drag force creates a turning moment contributing to a nose down attitude. The weapon pod 34 may be mounted for movement on a parallelogram support linkage 34A of generally known type and is actuated by an hydraulic motor 36 connected to the pod by linkage 38.

Additional equipment of the airplane operatively associated with the subject trim correction system are an autopilot 40, a Mach meter 42, and additional electrical equipment linking the signal generator units and the autopilot 40 to the pilot valve 26. This additional electrical equipment may include a mixer 46, feedback loop mixer 48, servo amplifier 50 and feedback synchro unit 52, all as shown in Fig. 3.

Associated operatively with the Mach meter 42 and with each of the hydraulic motors 30 and 36 are signal generator units 54, 56, and 58. Essentially they constitute means for translating the mechanical movements of the weapon pod 34, speed brakes 28 or Mach meter pointer into variations of an electric current. Various schemes may be employed to accomplish this but as shown in the drawings the units 54, 56 and 58 are motion detector units in the form of potentiometers connected so that the movable contact of each will be moved in direct correspondence with the movement of the associated movable member. To do this the potentiometer units may be mounted directly on the member whose movement they are to measure or they may be remotely located with mechanical, hydraulic, or electrical means used to transmit the movement. Under the leeway provided by the diagrammatic nature of Fig. 3 it may be interpreted as being illustrative of both methods. If the potentiometer units 54, 56, or 58 are remotely located, then the Mach meter 42 and each motor 30 or 36 will have their respective motion pick-off units 54A, 56A or 58A connected by suitable motion transmission linkage (indicated by the dash lines) to the respective potentiometer units 54, 56 or 58. On the other hand, if the potentiometer units are located right at the motor location, then the respective pick-off units would be closely coupled thereto.

The system elements just previously described are combined in Fig. 3 to provide a versatile pitch trim correction apparatus operating through the normally provided autopilot and power servo actuator mechanism used to operate the horizontal stabilizer and flight control surface. The operative relationship may be traced in this figure wherein the basic or primary control signal from the autopilot 40 passes through mixers 46 and 48 into amplifier 50 which steps up the low level signal to a level sufficient to provide satisfactory operation of the pilot valve 26. As is well known in the art, the pilot valve controls operation of the slave valve 22 which in turn controls the application of hydraulic power to the reversible actuator 18. Any changes of adjustment of control surface 10 by operation of motor 18 are fed-back by a mechanical connection 60 to feed-back synchro 52 which converts the fed-back movement to an electrical signal which is then introduced to the autopilot system through the agency of mixer 48 in the manner and for the purpose now well known in the art. At the same time supplementary signals originating as the result of operation of the Mach function potentiometer 54, of rocket pod pick-off potentiometer 58 or of speed brake pick-off potentiometer 56 may feed into mixer 46 and proceed through the established channel of mixer 48, amplifier 50, pilot valve 26, slave valve 22 and actuator 18 to cause a trimming adjustment of control surface 10.

A more precise idea of the form and relationship of the elements of the trim correction sub-system may be obtained from Fig. 4 in which is also shown a portion of an interconnected system by which control of the operation of the speed brakes may be obtained. Starting with the Mach function potentiometer 54, it may be seen that a voltage is applied across the resistance winding thereof.

In conformity with available supply in current aircraft practice, a potential of 28 volts and a frequency of 400 cycles is indicated. The voltage drop in the potentiometer then will be 28 volts and depending on the position of the slide or pick-off 62, a proportionate amount thereof will be impressed on the winding of rocket pod pick-off potentiometer 58 since the latter is connected to the slide 62 by cable 64. The physical position of the slider 62 on winding 54 will be determined by operation of Mach meter 42 which has a pick-off 54A linking its movable element operatively to the slider. Thus slider 62 will be automatically moved up or down in conformity with changes in airspeed or Mach number.

The slider 66 of potentiometer 58 is linked to be moved up and down on the winding in conformity with the extension or retraction of the rocket pod 34. The full line position of slider 66 may correspond to the retracted position of the rocket pod while the dotted line position would then correspond to the fully extended position of the pod. It should be noted that the slider 66 is indicated as stopping considerably short of the end of the resistance winding for a purpose that will appear later. Whatever voltage (26 volts or less in the present instance) is impressed on winding 58, a proportionate but lesser amount will be picked-off by slider 66 which is connected by electrical lead 68 to a coil of transducer 70 and is continued from the other end thereof as lead 72. Transducer 70 may be considered a part of mixer 46 but at any rate it serves to transfer energy from the trim pick-off circuit whenever there is a current flow through leads 68—72. The energy thus transferred is introduced through the mixer 46 to the autopilot system as a pitch trim correction signal.

The remaining end of lead 72 terminate in an electrical connection with slider 74 of speed brake pick-off potentiometer 56. Applied to the winding of this potentiometer is the 26 volt, 400 cycle supply so that the slider, depending on its contact position will pick-off some proportionate amount ranging downward from the 26 volt level. The position of slider contact 74 shown in the drawings is that corresponding to the fully retracted position of the speed brakes 28. As the speed brakes are extended the slider will be moved concurrently therewith and whenever the extending movement of the brakes is halted at any one of the operative positions attainable by them, the slider will have moved a proportionate part of its total range of movement and will then pick-off from the potentiometer 56 a voltage constituting a proportionate part of the total volage drop of 26 volts.

In setting up this circuitry, the initial positions of the sliders 66 and 74 will be selected such that they will both normally pick-off voltages of the same level so that there will be no current flow from one to the other through transducer 70. Actually the potentiometers 56 and 58 joined by leads 68 and 72 through transducer 70 form in effect a bridge circuit. Now, supposing that the rocket pod 34 is extended, slider 66 will in conformity therewith, be moved to a position to pick-off a voltage which will be appreciably lower than the voltage at slider 74 and there will then be a flow of current in the circuit leading from 74 through lead 72, transducer 70, lead 68 to slider 66 and thence through the lower portion of potentiometer 58 to ground. This current flow will energize the transducer 70 and a signal will thus be introduced into the mixer 46 to result in a trim adjustment of the stabilizer 10 in the manner previously outlined. The magnitude of the signal will determine the amount of readjustment of the stabilizer so that by proper design of the components of the system, the neutralizing counter pitching moment developed by the stabilizer adjustment will just balance that produced by the rocket pod. As has been previously indicated, the amount of drag increases with the speed of the airplane and so at higher speeds it is desirable that a greater pitch trim correction be introduced. This requirement is supplied by the Mach function potentiometer which is caused to yield a pick-off voltage varying in correspondence with airspeed. Suppose that with the pod 34 extended as before, at some airspeed the slider 62 might have the position shown in Fig. 4 of the drawings. Now if the airspeed were increased the slider 62 would be moved downwardly to pick-off, a lower voltage than before. This lower voltage would then constitute the entire voltage drop through the potentiometer 58 and in consequence, the slider 66 would pick-off an even lower voltage than before while the voltage picked off by slider 74 would remain the same. Therefore, the voltage difference between sliders 66 and 74 would be greater than in the previous case and consequently the current flow through transducer 70 would be proportionately greater so that the pitch trim correction bias applied to the stabilizer control system will also be greater with the end result being a greater deflection of stabilizer 10. If now the airspeed increases still further or perhaps decreases, the slider 62 will reflect such change and the voltage drop through the winding of potentiometer 58 will vary accordingly with the end results to be expected as explained above.

Considering now the case involving the extension of the speed brakes 28, in Fig. 4 is shown a form of control for causing extension or retraction of these units. An operating control of conventional type is shown at 76 connected to move a slider 78 on a potentiometer 80. This slider picks off a varying voltage according to its position and this voltage is impressed as an input signal on a servo amplifier 82. This amplifier could be generally similar to amplifier 50 and would serve to control an hydraulic power system like that in Fig. 3 to cause extension or retraction of the speed brakes. A feed-back connection 84 is run from lead 72 to amplifier 82 to reflect the position of slider 74 and hence that of the speed brakes. Assuming then that the brakes are extended as the result of operation of control 76; such extension will cause movement of slider 74. In order to make the resultant signal out of the pitch trim circuit capable of producing the desired result, the slider 74 should move such as to pick-off a higher voltage than before it was so moved. The reason for this will be explained hereinafter. With slider 74 moved upwardly to pick-off this higher voltage, there will then be a difference of potential between it and slider 66 so that a resultant current will flow passing through transducer 70. This current will be in proportion to the movement of slider 74 and the degree of extension of the speed brakes 28. It should be remembered that the voltage level for any setting of slider 66 varies in correspondence with airspeed, being changed through the action of Mach function potentiometer 54. Thus at any time the potential difference between sliders 74 and 66 will not only depend on their relative positions but also on that of slider 62. Therefore the initial stabilizer adjustment occurring upon extension of the speed brakes 28 will reflect in part a component predicated on the relative speed level and furthermore any changes therein will cause corresponding change in the stabilizer bias. Now the reason for causing slider 74 to start at a lower voltage and pick-off succeedingly higher voltages as the brakes are extended is that as airspeed increases, the voltage at slider 66 decreases, thus increasing the differential at slider 74 allowing a larger current flow and resultant greater stabilizer bias. However, if slider 74 had been initially moved downwardly it would have picked off a voltage lower than that of slider 66. A resultant current would flow but then if airspeed were to increase, the potential of slider 66 would fall lower tending to decrease the difference of potential between sliders 66 and 74. This would decrease the current flow resulting in decreased bias on the stabilizer 10 which would be an opposite effect to that desired under the circumstances.

Another factor previously mentioned, namely, the limited range of movement of slider 66 to prevent it from moving downwardly below a minimum voltage pick-off point, is involved in the possibility that under certain circumstances it may happen that the slider 66 of rocket pod pick-off potentiometer 58 would be at one limit position on the low end of the voltage range. If at this point the pick-off voltage were zero or very close thereto, variations introduced by operation of the Mach function potentiometer would have substantially no effect on the potential at the pick-off point of slider 66. Under this condition, if the speed brakes 28 are extended, the accompanying pitch trim adjustment would not include a factor derived from the relative speed level. However, if the range of movement of slider 66 is limited as previously suggested so that it will at all times pick off a positive voltage, for instance about one-quarter of the total voltage drop through the winding, then there will be sufficient latitude for the Mach function potentiometer variations to always exert an appreciable influence on the other elements of the pitch trim correction circuit. The same effect could be obtained by inserting a separate resistance between the lower end of potentiometer 58 and ground.

It is evident that the same or somewhat modified results might be obtained by varying the arrangement and/or type of electrical units making up the described pitch trim correction circuit, including variation of the initial settings of the sliders on the potentiometer units in the trim correction circuit. Also, depending on the relative location of the drag producing equipment, the trim deviation and correction might be about some axis other than the pitch trim axis and it is intended that all such modifications may be made without departing from the basic concept which is the present invention.

We claim:

1. In a variable speed aircraft, the combination of an autopilot, a trim control surface, actuating means respectively operatively connected to the autopilot and trim control surface for translating control impulses originated by the autopilot into angular displacements of the control surface, adjustable equipment mounted on the aircraft which as an incident to its intended function develops drag and trim changing force moments, a speed sensitive device, means for generating a signal in accordance with the position of said equipment, means for modifying said signal in response to the output of said device, and mixing means for superimposing said modified signal on said control impulses to effect a change in the trim of said aircraft in compensation for changing drag force moments derived either from changes of speed of the air craft or from changes of position of the equipment.

2. In a high speed airplane, the combination of extensible speed brakes operably mounted on the airplane in positions at which the resultant drag developed thereby creates an attitude deviation of the airplane, means providing a signal indicating the speed of said airplane, an attitude stabilizing surface adjustably mounted on the airplane, an autopilot system connected to operate the said surface, and means operatively connected to said first-named means to receive a signal therefrom and connected to receive a signal indicative of the position of said speed brakes and further connected to said autopilot system for introducing an attitude restoration signal thereto.

3. In a high speed vehicle, the combination of an extendible rocket pod, extendible speed brakes, an adjustable stabilizer, an operating system connected to cause movement of the adjustable stabilizer, an airspeed responsive unit, means connected to the rocket pod, speed brakes, and airspeed responsive units for generating signals indicative of movements thereof, means for biasing both said rocket pod and speed brake signals in accordance with said air speed signal, means for combining said biased signals to produce a trim correcting signal, and means for feeding said trim correcting signal to said operating system to effect a component of movement of said stabilizer as a function of rocket pod and speed brake motion and air speed.

4. In a high speed aircraft, the combination of retractable equipment mounted on said aircraft, adjustable airbrakes on said aircraft, attitude controlling aerodynamic surfaces on said aircraft, a servo system for operating said surfaces, autopilot means for generating and feeding to said servo system a primary control signal, a Mach meter having an output signal indicative of airspeed, a first pick-off having an output signal indicative of the position of said equipment, a second pickoff having an output indicative of the position of said airbrakes, means for modifying one of said position signals in accordance with said airspeed signal, a transducer having a primary winding, means for coupling said modified position signal and the other of said position signals to respective ends of said primary winding whereby said other position signal is also modified by said airspeed signal and both modified signals are combined, and mixing means including said transducer and coupled with said autopilot for superimposing on said primary control signal the combined signals in said winding.

References Cited in the file of this patent

UNITED STATES PATENTS

| | | |
|---|---|---|
| 1,862,902 | McDonnell | June 14, 1932 |
| 2,262,968 | Schmidt | Nov. 18, 1941 |
| 2,549,020 | Seldon | Apr. 17, 1951 |
| 2,683,004 | Alderson et al. | July 6, 1954 |
| 2,698,149 | Greenwood et al. | Dec. 28, 1954 |